(No Model.)  4 Sheets—Sheet 2
W. SIEMENS.
ELECTRICAL MEASURING AND CONTROLLING APPARATUS.
No. 399,292.  Patented Mar. 12, 1889.
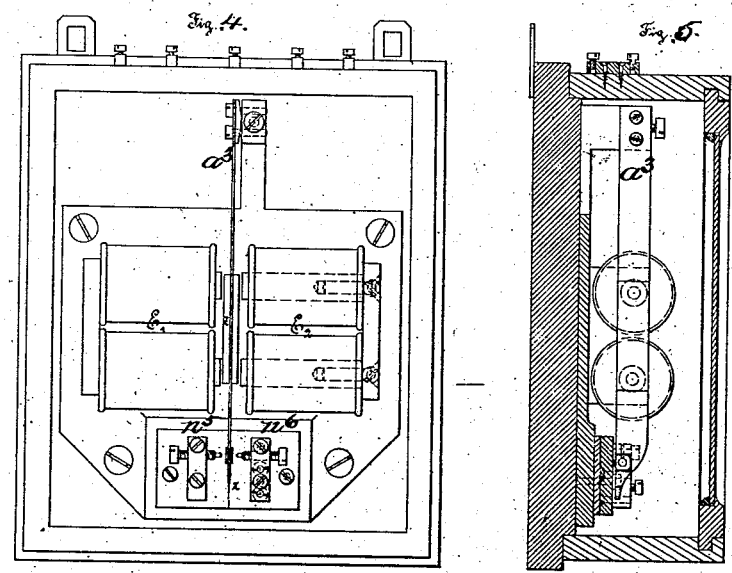
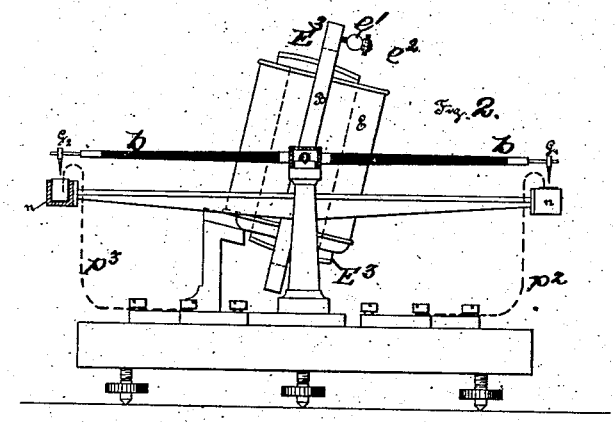
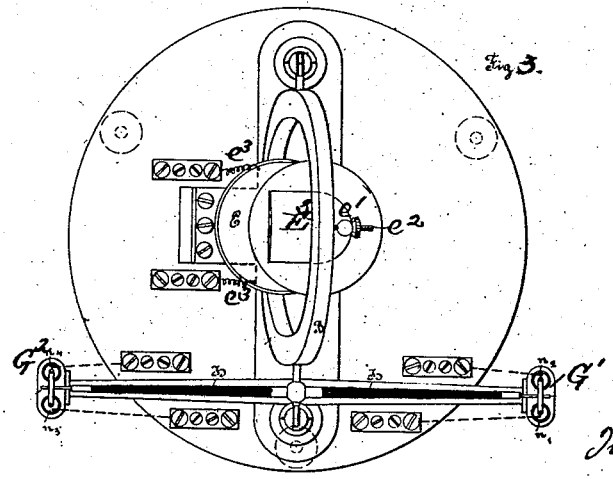

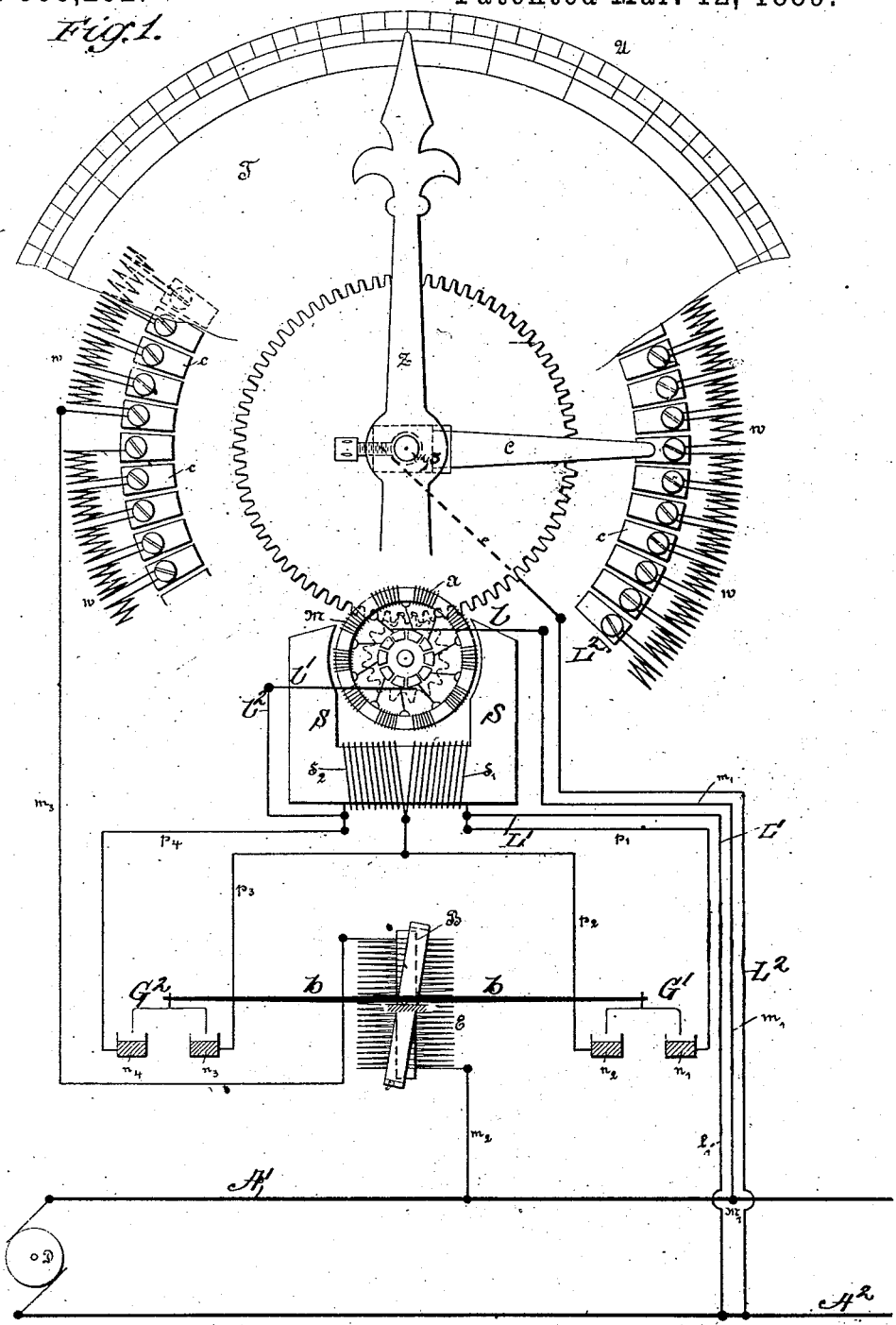

(No Model.)
W. SIEMENS.
ELECTRICAL MEASURING AND CONTROLLING APPARATUS.
No. 399,292. Patented Mar. 12, 1889.
4 Sheets—Sheet 3.
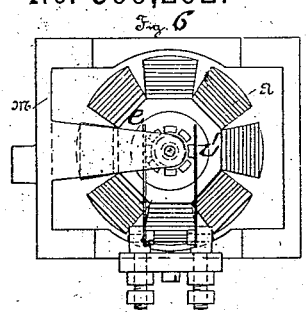
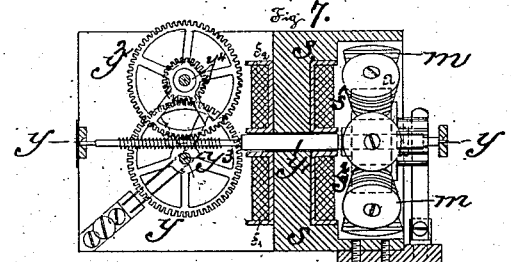
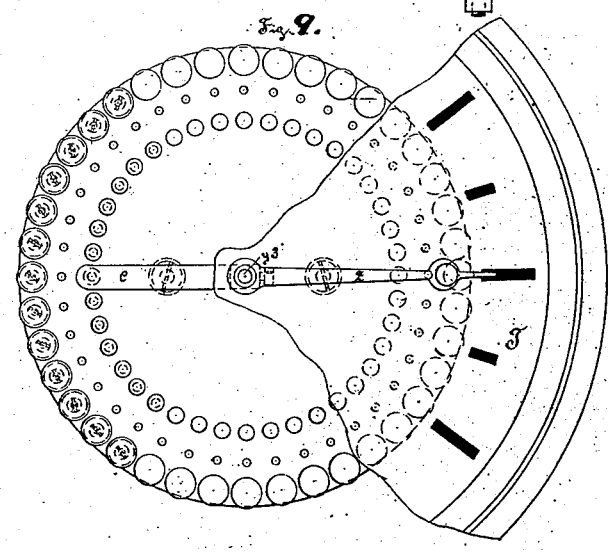
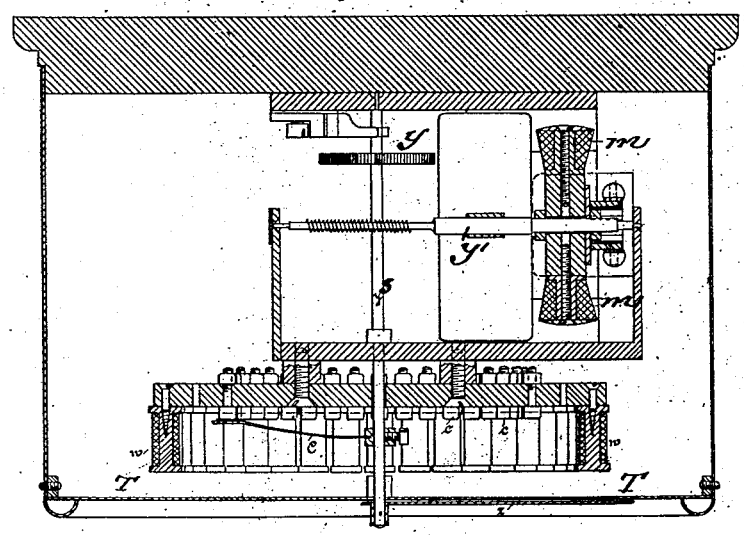
Witnesses:
Inventor:

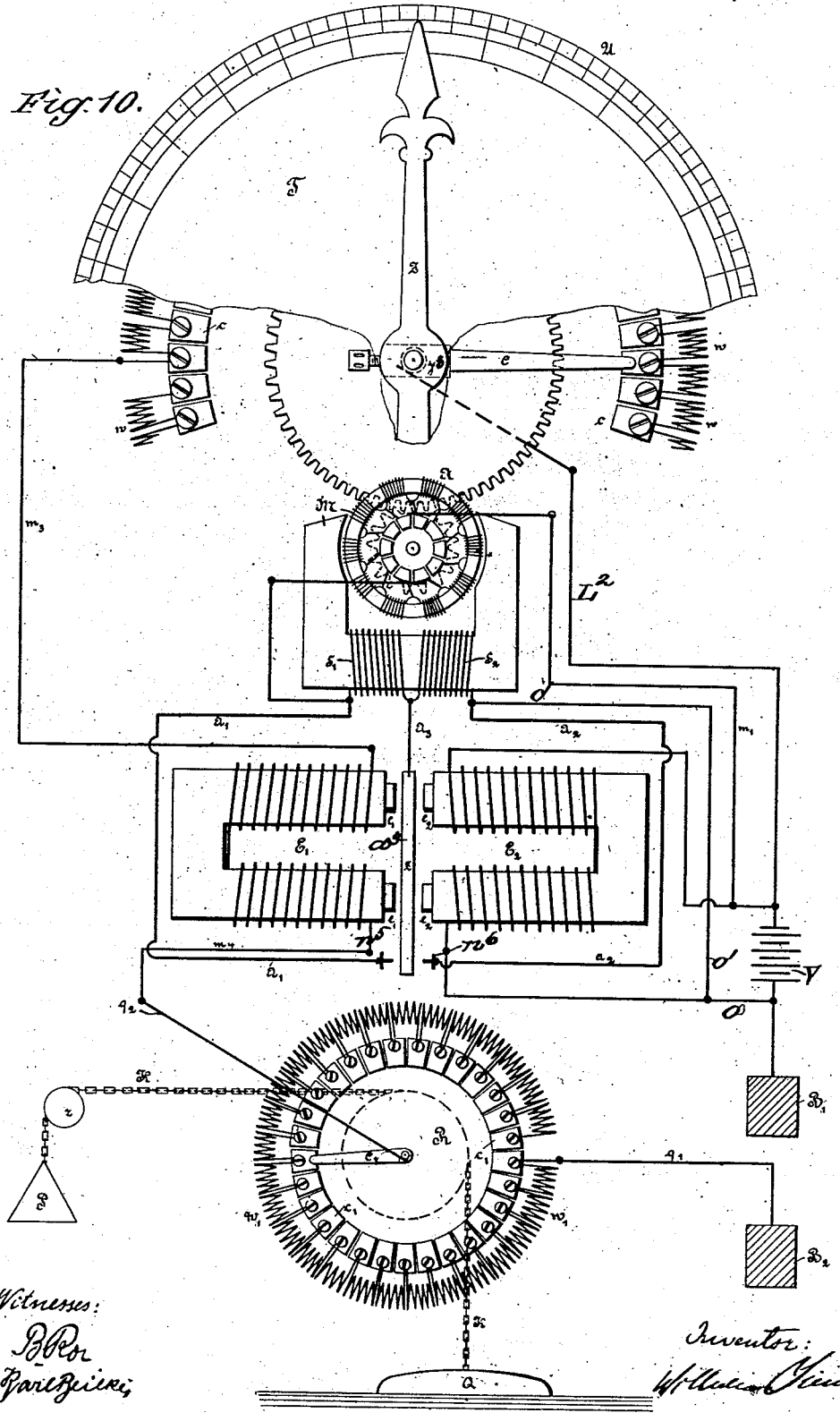

UNITED STATES PATENT OFFICE.

WILHELM SIEMENS, OF BERLIN, GERMANY, ASSIGNOR TO SIEMENS & HALSKE, OF SAME PLACE.

ELECTRICAL MEASURING AND CONTROLLING APPARATUS.

SPECIFICATION forming part of Letters Patent No. 399,292, dated March 12, 1889.

Application filed December 2, 1887. Serial No. 256,806. (No model.) Patented in Germany November 2, 1886, No. 40,299.

*To all whom it may concern:*

Be it known that I, WILHELM SIEMENS, a subject of the King of Prussia, German Emperor, residing in the city of Berlin, in the German Empire, have invented certain new and useful Improvements in Electrical Measuring and Controlling Apparatus, (for which I have obtained Letters Patent in the German Empire, No. 40,299, bearing date November 2, 1886,) of which the following is a specification.

My invention relates to apparatus made use of for the observation and measurement of physical magnitudes of every description— for instance, the measurement of the potential difference between any two points of an electrical circuit, the height of water-level, &c.—and the object thereof is to render such measurement easy and reliable without resorting to the use of sensitive measuring-instruments, which might require skilled attendants and frequent adjustments. This object is attained in case of the measurement of length by the conversion of that measurement into one of the potential difference of two points in an electrical circuit; and my invention relates to apparatus used for such conversion and for the measurement of the potential difference which may be caused thereby.

Referring to the accompanying drawings, in which corresponding parts are designated by similar letters, Figure 1 is a diagram representing the arrangement of the apparatus used to effect the measurement of the potential difference. Fig. 2 is a side view of the magnet E. Fig. 3 is a top view thereof. Fig. 4 is a front view of a mechanism which may be substituted for the said magnet E. Fig. 5 is a side view thereof. Figs. 6 and 7 are details of the motor. Fig. 8 is a section of the motor on line $y\ y$ of Fig. 7, showing it attached to the resistances and dial. Fig. 9 is a detail of the dial and resistances, showing the former partially broken away. Fig. 10 is a diagram of my invention as applied to the measurement of water-level.

From the wire $A'$ of an electrical circuit is branched an electrical conductor, $m^2$, leading to a magnet, E, and from the said magnet E leads the conductor $m^3$ to the resistances $c\ c$, which are arranged in the arc of a circle and are traversed by a contact-lever, C, connected by means of the conductor $L^2$ with the wire $A^2$ of the main circuit.

The magnet E, which is inclined, is provided with an iron core having upon its ends diagonally-opposite eccentric heads $E^3\ E^3$ provided with curved faces. An iron ring, B, is mounted upon an axis of rotation around the said magnet E in an oblique or inclined position corresponding therewith, and is provided with a weight, $e'$, traveling upon a screw, $e^2$, projecting from the said ring, or instead of weight springs $e^3\ e^3$ may be used, or both may be employed, as shown in Fig. 3, to alter the force necessary to keep the ring B from assuming a horizontal position. The eccentric heads $E^3\ E^3$ of the core are so arranged in relation to the ring B as to tend to draw it back into a vertical position when excited by a current passing through the said magnet E.

A double lever, $b$, of insulating material, is attached to the axis of rotation of the said ring and moves therewith, it being so arranged in relation thereto that when the ring is in its normal position the conductive stirrups $G'\ G^2$ upon the ends of the said lever are out of contact with the cups $n'\ n^2\ n^3\ n^4$, filled with mercury and placed below the legs thereof; but that, if the position of the ring is changed by a variation in the strength of current passing through the magnet E, either the cups $n^3\ n^4$ are connected in case of an increase of current or the cups $n'$ and $n^2$ are connected in case of a decrease of current, for it is evident that the position of the ring B depends upon the strength of the current passing through the magnet E, for as that current increases the magnetism of the core of the magnet E increases, and the ring is caused to assume a more upright position by the attraction of the eccentric heads $E^3\ E^3$. The amount of current necessary to cause the ring B to assume its normal position may be accurately regulated by means of the said springs or weight. The conductors $m^2\ m^3\ L^2$, resistances $c\ c$, magnet E, and contact-lever C, constitute a circuit, which I will call, as a means of identification, the "regulating-circuit." A conductor, $m'$, is branched off from the conductor A' of the main circuit and terminates in a brush, $l$, bearing upon the commutators of an armature, $m$, while a brush, $l'$, bears upon the opposite commutators, the said commutators being attached to the coils of the armature in any suitable manner known and employed in electric motors. The brush $l'$ is attached to one end of a conductor, $l^2$, the other end thereof being connected to one end of the conductor $p^4$, and one end of the coil $S^2$, which surrounds one leg of the magnet $S$, between the poles of which the armature $m$ revolves, while around the other leg of the magnet is a coil, $S'$, wound in a direction opposite to the coil $S^2$, so that in case an electric current passes through both the coils at the same time they will neutralize each other. The other end of the coil $S^2$ is connected to the conductor $A^2$ of the main circuit through the coil $S'$ and conductor $L'$. The other end of the conductor $p^4$ communicates with the cup $n^4$, placed beneath one leg of the stirrup $G^2$ and filled with mercury. Under the other leg of the same stirrup is another cup, $n^3$, of mercury, connected by means of a conductor, $p^3$, with the abutting ends of the coils $S'$ and $S^2$, while these ends are also connected to a cup, $n^2$, of mercury situated below one leg of the stirrup $G'$. Under the other leg of the said stirrup is a cup, $n'$, also filled with mercury and connected to the conductor $L'$ through the conductor $p'$. The shaft $y'$ of the armature $m$ has a worm-gearing thereon, the said worm registering with a gear-wheel, $y^2$, provided with a pinion, $y^4$, gearing with the wheel $y$, upon the shaft $y^3$ of which are mounted the contact-lever $C$, hereinbefore mentioned as traversing the resistances $c\ c$, and a pointer, $Z$, traveling upon a scale or dial, $T$. By this mechanism the contact-lever $C$ and pointer $Z$ are caused to revolve at the same time with the armature $m$. The conductors $m'$, $l^2$, and $L'$, brushes $l$ and $l'$, armature $m$, and coils $S'$ and $S^2$, or conductors $p^4$ $p^3$ $p^2$ $p'$, and stirrups $G^2$ and $G'$, form a circuit, which I term, for the sake of identification, the "measuring-circuit."

The operation of this apparatus is as follows: Let it be supposed that no electricity is passing over the main circuit, and that no difference of potential exists between the terminals of the regulating-circuit. If this be so, the ring $B$ is at its greatest possible inclination, the stirrup $G'$ connecting the cups $n'\ n^2$, the pointer $Z$ is on the dial-mark $O$, and the contact-lever $C$ is not including any of the resistances in the said circuit. If, now, a current be made to pass over the main circuit a potential difference will be caused between the points at which the regulating-circuit leaves and unites therewith, the amount of such difference being determined by the resistance encountered by the electricity in passing over that part of the main circuit lying between these two points. A part of the said electricity proportional to the potential difference will pass over the conductor $m^2$ to the magnet $E$, exciting the iron core thereof and causing it to attract the ring $B$ and connect the cups $n^3$ and $n^4$ by means of the stirrup $G^2$. After passing through the magnet $E$ the current passes over the conductor $m^3$ to the contact-lever $C$, to the conductor $L^2$, and thus back to the main circuit. Another portion of the said electricity passes over the conductor $m'$ to the brush $l$, through the armature-coils and brush $l'$, to the conductor $l^2$. As the current passing through the regulating-circuit has caused the stirrup $G^2$ to connect the cups $n^3$ and $n^4$, there are two circuits for the passage of the electricity from the conductor $l^2$ to the coil $S'$ of the magnet, the one circuit being through the coil $S^2$ and the other through the cups $n^4$ and $n^3$ and conductors $p^4$ and $p^3$; but as the resistance of the latter circuit is smaller than that of the former one the coil $S^2$ is short-circuited and the coil $S'$ is included in the circuit, as the lever $b$ in making a contact between the cups $n^3$ and $n^4$ has broken that which had existed when the current started between $n'$ and $n^2$. The electricity therefore passes from the armature by means of brush $l'$, conductors $l^2\ p^4$, cups $n^3$ and $n^4$, and conductor $p^3$, coil $S'$, and conductor $L'$ back to the main circuit. The current in passing over the coil $S'$ excites the corresponding leg of the magnet, causing the armature to rotate, imparting motion to the shaft $y^3$. By the revolution of this shaft the contact-lever $C$ is moved over the resistances $c\ c$, thus including a certain number of them in the regulating-circuit, and at the same time the pointer moves upon the dial. The passage of the current in the measuring-circuit continues over the above-described course until the rotation of the armature has included such a number of resistances in the regulating-circuit as to cause the strength of the current passing therethrough to become so weak as to permit the ring $B$ to return to its normal position, in which case the contact is broken between both of the sets of cups $n'\ n^2$ and $n^3\ n^4$, and the current in the measuring-circuit is forced to pass through both the coils $S'$ and $S^2$ and the armature to cease to rotate. The pointer $Z$ now indicates the number of known resistances it has been necessary to include in the regulating-circuit in order to keep the current therein constant and uniform at a strength which is sufficient to keep the ring $B$ in its normal position; but as the amount of resistance to be included is in direct ratio with the potential difference at the terminals of the regulating-circuit the dial indicates the said difference. If the potential difference between the terminals of the regulating-circuit now becomes less the ring $B$ will incline more to one side, carrying with it the lever $b$, thus connecting the cups $n'$ and $n^2$ and causing the coil $S'$ to be short-circuited and the current to pass through the coil $S^2$, revolving the armature in a direction opposite to the direction of rotation which it has on the first flow of the current or an increase thereof, and thus causing the contact-lever C to move backward and cut out of the regulating-circuit enough resistances to cause the current therein to again become constant and cause the ring B to assume its normal position, thus stopping the rotation of the armature. In case of an increase of the potential difference the action is the reverse of that just described as being the operation in case of a decrease of the potential difference.

In case it is desired to measure the height of water-level the apparatus shown in Fig. 10 may be used. This apparatus consists of a float, Q, adapted to rise and fall with the water-level and attached to one end of a chain, K, to the opposite end of which is a counterpoise, P. The chain passes over a chain-wheel, R, to which is attached a contact-lever, C', moving upon a series of resistances arranged concentric to the axis of the said wheel. One of the said resistances is connected to the ground-plate $B^2$, while the contact-lever C' is connected with a conductor, $g^2$. As the height of the water-level varies the chain-wheel rotates, and with it the contact-lever C', whereby the resistance between the ground-plate $B^2$ and conductor $g^2$ increases or decreases as the water-level rises or falls. If one conductor of an electrical circuit is now connected to the conductor $g^2$ and the other conductor of the said circuit provided with a ground-connection, it is evident that the conductor $g^2$, contact-lever C', and ground-plate $B^2$ will form a portion of an electrical circuit. It is also evident that the potential difference between the two conductors will depend upon the resistance of the connecting parts $g^2$, C', and $B^2$, and resistances c' c'; but as the resistance of these parts depends upon the water-level the measurement of the latter resolves itself into one of potential difference, which may be effected in the hereinbefore-described manner.

Fig. 10 also shows a modification of the apparatus for effecting this measurement of potential difference. In this arrangement the conductor $g^2$ is connected by means of a conductor, $m^1$, to the coils surrounding the legs of a magnet, E', and through them with the resistances c c, which are also connected to a conductor, $L^2$, in the manner already described. The said conductor $L^2$ is connected to one pole of a suitable generator, V, the other pole of which has a ground-connection, B'. To this latter pole of the generator is attached in series by the conductor o the coils of an electro-magnet, $E^2$, the poles of which are opposite to the poles of the magnet E', the said coils being also connected to the conductor $L^2$, and thus to both poles of the generator. A conductor, o', is connected to that conductor o, and is also attached to one end of the coil $S^2$ of the horseshoe-magnet, while the opposite end of the said coil is joined to one terminal of a coil, S', wound in a direction opposite to the coil $S^2$ around the other leg of the magnet. The other end of the coil S' is connected in the manner described in relation to coil S' in Fig. 1, with the other pole of the generator through the armature revolving between the poles of the magnet. Attached to the same end of the coil $S^2$ as the conductor o' is a conductor, $a^2$, leading to a contact-piece, $n^6$, situated below the poles of the magnet $E^2$. Attached to the same end of the coil S' as the armature is a conductor, a', leading to a contact-piece, $n^5$, situated below the poles of the magnet E'. Attached to the connecting ends of the coils S' and $S^2$ is a tongue, $a^3$, of flexible or springy magnetic material suspended between the poles of the magnets E' and $E^2$ and between the contact-points $n^5$ and $n^6$, and adapted when attracted by either of the said magnets to make an electrical connection with the contact-point situated thereunder. Two principal electric circuits are thus formed, the one starting from the generator and passing through the ground-plates B' $B^2$, resistances c' c', coil of the magnet E', and resistances c c, back to the generator, which corresponds to the circuit which I previously called the "regulating-circuit," and the other circuit passing from one pole of the generator through either or both of the coils $S^2$ and S' and armature m back to the other pole of the generator, which corresponds to the circuit which I have previously called the "measuring-circuit," the coils of the magnet $E^2$ being in shunt-circuit thereto. Suppose, now, that the water-level is at a certain height and that a certain number of resistances c c' are included in the regulating-circuit thereby, and that a certain number of resistances c c are also included in the said circuit by means of the lever C, that the pointer Z rests upon the corresponding division of the dial, which may be so marked as to show directly the water-level or may show the potential difference caused thereby, and that the tongue $a^3$ hangs between the magnets E' and $E^2$ without touching either of the contact-pieces $n^5$ or $n^6$. If the water-level now falls, a corresponding number of resistances c' c' are cut out of the regulating-circuit and the current therein is increased, causing the magnet E' to attract the tongue until it touches the contact-piece $n^5$. The electric current passing through the measuring-circuit and coil $S^2$ included therein has now two courses open to it to follow—the one over the coil S' and the other through the tongue $a^3$ and contact-piece, $n^5$, to the conductor a' and the armature. As the resistance of the latter is much the less of the two circuits, the current passes over it, thus short-circuiting the coil S' and causing the coil $S^2$ to excite the magnet. The current then passes through the armature m, causing it to revolve and the contact-lever to include such a number of resistances c c in the regulating-circuit as will equal those cut out by the fall of the water, while the pointer Z registers the changes on the dial. When this has taken place, the current passing through the regulating-circuit assumes its normal strength and permits the tongue to swing into its normal position and out of contact with the point $n^5$; but if the water-level rises, the number of resistances $c^t$ $c'$ in the regulating-circuit is increased and the amount of current passing therethrough decreased, so that the attraction of the magnet $E^2$ for the tongue $a^3$ will outbalance that of the magnet $E'$, thus causing the tongue to short-circuit the coil $S^2$ by making a contact with the point $n^6$, and causing the armature to revolve in the opposite direction, and thus cut out enough resistances $c$ $c$ to keep the potential difference and the current strength of the regulating-circuit normal. When this has been done, the tongue will again assume its position between the two magnets, causing the measuring-circuit to pass through both coils $S'$ and $S^2$, which neutralize each other, and the armature ceases to rotate.

Instead of having the coils of the magnet $E^2$ arranged in shunt-circuit with the measuring-circuit, they may be arranged in series therein, and various other modifications may be used without departing from my invention, which is characterized by the feature that the intensity of the current in the regulating-circuit is automatically kept constant, so that a measurement of magnitude is reduced to a measurement of resistance, or, in other words, to a measurement of length. Therefore, it is evident that the magnets shown in Fig. 10 and in detail in Figs. 4 and 5 may be substituted for the magnet E in Fig. 1 without altering the invention.

Having now described my invention, what I claim, and desire to secure by Letters Patent of the United States, is—

1. In an electric meter, the combination of two electrical circuits, an electromotor, the field and armature coils thereof forming a part of one of the said circuits, means actuated by the other or second circuit for controlling the said motor, and resistances adapted to be included in or excluded from the second, thereby changing the amount of current passing through the second circuit, while the current in the first circuit remains unchanged by the insertion or exclusion of the said resistances, as and for the purpose described.

2. In an electric meter, the combination of a measuring and regulating circuit, an electromotor, the field and armature coils thereof forming a part of the measuring-circuit, means included in the regulating-circuit for controlling the movements of the armature of the motor, and resistances adapted to be included in or excluded from the regulating-circuit, varying the current thereof, while the current in the measuring-circuit remains unaffected thereby, as and for the purpose described.

3. In an electric meter, the combination of a measuring and regulating circuit, a motor the field and armature coils of which are included in the measuring-circuit, a contact-arm rotated thereby, resistances traversed by the said arm, and means included in the regulating-circuit for changing the polarity of the magnetic field of the said motor, whereby the contact-arm is caused to include or exclude the said resistances from the said regulating-circuit, varying the current thereof, while the current in the measuring-circuit remains unaffected thereby, as and for the purpose described.

4. In electrical measuring and controlling apparatus, the combination of two electrical circuits, an electromotor included in one of the said circuits, a magnet, E, excited by the current of the other circuit and adapted to regulate the said motor, and resistances adapted to be included in and excluded from the same circuit as excites the magnet E by means of the said motor, as and for the purpose described.

5. In electrical measuring and controlling apparatus, the combination of two electrical circuits, an electromotor included in one of the said circuits, resistances adapted to be included in the other circuit thereby, a magnet, E, excited by the current of the same circuit, and a lever provided with contact-points and adapted to be moved by the said magnet E, whereby the motor may be regulated, as and for the purpose described.

6. In electrical measuring and controlling apparatus, the combination of two electrical circuits, an electromotor, coils surrounding the legs of the magnet thereof and included in one of the said circuits, resistances adapted to be included in the other of the said circuits by the said motor, and means included in the same circuit with the resistances, whereby the supply of electricity to the said leg-coils may be evenly or unevenly distributed, as and for the purpose described.

7. In electrical measuring and controlling apparatus, the combination of two circuits, an electromotor, coils surrounding the legs of the magnet thereof and included in one of the said circuits, resistances adapted to be included in or excluded from the other circuit, a magnet, E, included in the same circuit with the resistances, and a lever of insulating material having conductive stirrups attached to the ends thereof, whereby the electricity may be supplied to either or both of said leg-coils of motor, as and for the purpose described.

8. In electrical measuring and controlling apparatus, the combination of two electrical circuits, an electro-magnet actuated by one of the said circuits, means actuated by the other of the said circuits for regulating the electricity supplied to the said motor, resistances, and a conductive arm adapted to be moved by the said motor, whereby the resistances are included in or excluded from the same circuit that actuates the means for regulating the motor, as and for the purpose described.

9. In an apparatus for regulating the flow of electricity, the combination of a magnet, E, having an oblique position, a core therein provided with eccentric heads, a ring mounted upon an axis of rotation, and an insulating-arm having conductive stirrups upon the ends thereof mounted upon the said axis of rotation, as and for the purpose described.

10. In an apparatus for regulating the flow of electricity, the combination of a magnet, E, having an oblique position, a core therein having an eccentric head upon each end thereof, a ring mounted upon an axis of rotation and provided with an adjustable weight, and insulating-arm having conductive stirrups upon the ends thereof mounted upon the said axis of rotation, as and for the purpose described.

11. In an electrical indicating and controlling apparatus, the combination of two circuits, an electromotor included in one of the said circuits, the shaft of the armature of the said motor gearing with another shaft, a contact-lever and pointer attached thereto, a dial, and resistances which are included in the other of the said circuits by the rotation of the motor, as and for the purpose described.

12. In an apparatus for the measurement of height, the combination of two electrical circuits, a wheel, R, adapted to be rotated as the said height to be measured varies, a contact-lever, C', mounted upon the said wheel, resistances $c'$ $c'$, adapted to be included in one of the said circuits, means included in the said circuit adapted to control an electro-magnet, a contact-lever, C, and resistances adapted to be included in the said circuit by the movement of the arm, a pointer, and a dial traversed thereby, and an electric motor actuated by the other of the said circuits and controlled by the said means provided therefor, and adapted to move the said contact-lever, as and for the purpose described.

13. In apparatus for the measurement of physical magnitude, the combination, with a measuring and a regulating circuit of electricity, of a set of resistances adapted to be included in or excluded from the said regulating-circuit, whereby the amount of current passing therethrough varies as the magnitude to be measured, a second set of resistances, a motor included in the said measuring-circuit, and of means included in the said regulating-circuit for controlling the motor, whereby it is caused to include or exclude the said second set of resistances in or from the said regulating-circuit, as and for the purpose described.

14. In an apparatus for the measurement of physical magnitude, the combination, with a measuring and a regulating circuit of electricity, of a set of resistances, a slide-contact moving thereon as the magnitude to be measured varies, whereby the resistances are included in or excluded from the said regulating-circuit, thereby changing the quantity of electricity passing therethrough, a second set of resistances, a motor included in the said measuring-circuit, and a magnet included in the regulating-circuit for controlling the motor, whereby it is caused to include or exclude from the said regulating-circuit a sufficient number of the second set of resistances to keep the current passing therethrough constant, as and for the purpose described.

WILHELM SIEMENS.

Witnesses:
B. ROI,
KARL BEILKY.